(12) United States Patent
Fies et al.

(10) Patent No.: US 8,999,512 B2
(45) Date of Patent: Apr. 7, 2015

(54) COATING MATERIAL COMPRISING UNSATURATED POLYESTER RESINS AND VINYL ETHERS

(75) Inventors: Matthias Fies, Landau (DE); Ulrich Poth, Muenster (DE); Oliver Seewald, Marsberg (DE); Wolfgang Bremser, Paderborn (DE)

(73) Assignee: BASF SE, Ludwigshafen (DE)

(*) Notice: Subject to any disclaimer, the term of this patent is extended or adjusted under 35 U.S.C. 154(b) by 544 days.

(21) Appl. No.: 13/389,536

(22) PCT Filed: Aug. 16, 2010

(86) PCT No.: PCT/EP2010/061899
§ 371 (c)(1),
(2), (4) Date: Feb. 8, 2012

(87) PCT Pub. No.: WO2011/023583
PCT Pub. Date: Mar. 3, 2011

(65) Prior Publication Data
US 2012/0141812 A1 Jun. 7, 2012

(30) Foreign Application Priority Data
Aug. 26, 2009 (EP) .................................... 09168667

(51) Int. Cl.
| | | |
|---|---|---|
| *C09D 167/00* | (2006.01) | |
| *C09D 167/06* | (2006.01) | |
| *B05D 3/06* | (2006.01) | |
| *C08G 63/52* | (2006.01) | |
| *C08G 63/56* | (2006.01) | |
| *C08L 67/00* | (2006.01) | |
| *C08L 67/06* | (2006.01) | |
| *C08L 29/10* | (2006.01) | |
| *C09D 4/06* | (2006.01) | |
| *C08K 5/00* | (2006.01) | |
| *C08K 5/11* | (2006.01) | |

(52) U.S. Cl.
CPC .............. *C09D 4/06* (2013.01); *C09D 167/06* (2013.01); *C08K 5/0025* (2013.01); *C08K 5/005* (2013.01); *C08K 5/11* (2013.01)

(58) Field of Classification Search
None
See application file for complete search history.

(56) References Cited

U.S. PATENT DOCUMENTS

| | | | | |
|---|---|---|---|---|
| 3,347,806 | A | | 10/1967 | Zimmermann |
| 5,254,603 | A | * | 10/1993 | Nahm ............................ 522/72 |
| 5,360,863 | A | * | 11/1994 | Meixner et al. ................. 525/28 |
| 5,420,205 | A | * | 5/1995 | Becker et al. ................. 525/168 |
| 5,470,897 | A | * | 11/1995 | Meixner et al. ................ 523/518 |
| 5,536,760 | A | * | 7/1996 | Friedlander et al. ............ 522/96 |
| 5,637,630 | A | * | 6/1997 | Atkins .......................... 523/523 |
| 5,688,867 | A | * | 11/1997 | Scheibelhoffer et al. ..... 525/168 |
| 5,703,198 | A | * | 12/1997 | Twigt et al. .................... 528/363 |
| 5,874,503 | A | * | 2/1999 | Scheibelhoffer et al. ..... 525/168 |
| 5,922,473 | A | * | 7/1999 | Muthiah et al. ............... 428/481 |
| 5,942,556 | A | | 8/1999 | Friedlander et al. |
| 6,001,892 | A | * | 12/1999 | Weissberg et al. ............ 522/107 |
| 6,054,502 | A | * | 4/2000 | Friedlander et al. ............ 522/96 |
| 6,455,111 | B1 | * | 9/2002 | Blum et al. .................... 427/498 |
| 6,489,406 | B1 | | 12/2002 | Mahbub et al. |
| 6,617,417 | B1 | | 9/2003 | Airola et al. |
| 6,849,693 | B2 | * | 2/2005 | Epple et al. ................... 525/176 |
| 2002/0082314 | A1 | * | 6/2002 | Blum et al. .................... 522/111 |

FOREIGN PATENT DOCUMENTS

GB          974 892       11/1964

OTHER PUBLICATIONS

International Search Report Issued Oct. 26, 2010 in PCT/EP10/61899 Filed Aug. 16, 2010.

* cited by examiner

*Primary Examiner* — Vivian Chen
(74) *Attorney, Agent, or Firm* — Oblon, McClelland, Maier & Neustadt, L.L.P.

(57) ABSTRACT

The use of a composition which is liquid under standard conditions (20° C., 1 bar) as a coating material, wherein the composition comprises
  a) an unsaturated polyester resin composed of α-olefinically unsaturated polycarboxylic acids, polyols, and optionally further compounds,
  b) compounds with vinyl ether groups (vinyl ethers for short), and
  c) optionally α-olefinically unsaturated polycarboxylic acids or their monoesters or diesters,
where
the sum of the double bonds of the α-olefinically unsaturated polycarboxylic acids from a) and optionally of the compounds c) to the double bonds of the vinyl ethers b) is in a molar ratio of 1.3:1 to 0.8:1.

20 Claims, No Drawings

COATING MATERIAL COMPRISING UNSATURATED POLYESTER RESINS AND VINYL ETHERS

The present invention relates to the use of a composition which is liquid under standard conditions (20° C., 1 bar) as a coating material, wherein the composition comprises
a) an unsaturated polyester resin composed of α-olefinically unsaturated polycarboxylic acids, polyols, and optionally further compounds,
b) compounds with vinyl ether groups (vinyl ethers for short), and
c) optionally α-olefinically unsaturated polycarboxylic acids or their monoesters or diesters,
where
the sum of the double bonds of the α-olefinically unsaturated polycarboxylic acids from a) and optionally of the compounds c) to the double bonds of the vinyl ethers b) is in a molar ratio of 1.3:1 to 0.8:1.

Solvent-free, radiation-curable coating compositions based on unsaturated polyester resins frequently comprise reactive diluents. Reactive diluents serve as solvents for the polyester resin and/or for setting a desired viscosity. Examples of known reactive diluents in combination with unsaturated polyester resins include styrene or (meth)acrylic monomers.

The solubility of the polyester resins in styrene or (meth) acrylic esters is frequently limited, meaning that undesirably large quantities of the reactive diluents are required. Furthermore (meth)acrylic monomers frequently have a sensitizing effect.

Combinations of unsaturated polyesters and vinyl ethers are described in WO 00/78833 for the production of moldings.

Radiation-curable coating compositions which can comprise vinyl ethers are known from U.S. Pat. Nos. 6,063,864 and 6,470,897.

U.S. Pat. No. 6,063,864 discloses radiation-curable coating compositions which in addition to the unsaturated polyester resin necessarily comprise styrene and vinyl ethers.

U.S. Pat. No. 5,470,897 discloses coating compositions which comprise (meth)acrylic monomers or vinyl ethers. The examples use exclusively (meth)acrylic monomers (1,4-butanediol dimethacrylate). The minimum amount of the (meth) acrylic monomers is 5% by weight. A curing method also disclosed in the description, alternatively to thermal curing, is radiation curing. Coating materials which comprise unsaturated polyesters and vinyl ethers and are cured by irradiation with reactive light are not disclosed.

An object of the present invention were radiation-curable coating compositions based on unsaturated polyesters and reactive diluents and exhibiting good performance properties. At the same time the reactive diluents used are to be very good solvents for the polyester resin.

The use defined at the outset has been found accordingly.

The terms "unsaturated polyester resin", "vinyl ethers", and "α-olefinically unsaturated polycarboxylic acids or their monoesters or diesters" are understood below always to include mixtures of different unsaturated polyester resins, mixtures of different vinyl ethers, and mixtures of different α-olefinically unsaturated polycarboxylic acids or their monoesters or diesters, respectively.

Unsaturated polyester resins a) are polyesters of polycarboxylic acids, preferably dicarboxylic acids, and polyols, preferably diols, the accompanying use of at least one α-olefinically unsaturated polycarboxylic acid as synthesis component being mandatory. α-Olefinically unsaturated polycarboxylic acids contemplated include more particularly maleic acid, fumaric acid, itaconic acid, mesaconic acid, citraconic acid; in the esterification, where possible, the compounds may also be used as the anhydride. Particularly preferred is maleic acid, which more particularly is also used as maleic anhydride.

Besides an α-olefinically unsaturated polycarboxylic acid, the unsaturated polyester resins may comprise further polycarboxylic acids and/or derivatives thereof such as anhydrides or esters with low molecular mass monoalcohols as a synthesis component. Examples include ortho-phthalic acid, isophthalic acid, terephthalic acid, trimellitic acid, trimesic acid, pyromellitic acid, tetrahydrophthalic acid, hexahydrophthalic acid, methylhexahydrophthalic acid, endomethylene-hexahydrophthalic acid, dicyclopentanedicarboxylic acid, succinic acid, glutaric acid, adipic acid, pimelic acid, suberic acid, azelaic acid, dodecanedicarboxylic acid, dimer fatty acids, resin acid adducts with acrylic acid or maleic acid, and also mixtures of such polycarboxylic acids.

Reaction partners of the polycarboxylic acids are polyols, preferably diols, such as, for example, ethylene glycol, propylene glycol, propane-1,3-diol; 2-methylpropane-1,3-diol; butane-1,4-diol; neopentyl glycol; ethylbutylpropanediol, and other so-called neo-diols (dialkylpropane-1,3-diols, alkylphenylpropane-1,3-diols); hydroxypivalic acid neopentyl glycol ester (HPN), pentane-1,5-diol; 2,2,4-trimethylpentane-1,3-diol; hexane-1,6-diol, trimethylhexanediol, dimer diols, dimethylolcyclohexane, dimethyloltricyclodecane, perhydrobisphenol A, ethoxylated bisphenol A. It is also possible, however, to use more highly polyfunctional polyols, such as glycerol, trimethylolethane, trimethylolpropane, ditrimethylolpropane, pentaerythritol, dipentaerythritol, trishydroxyethyl isocyanurate.

Unsaturated polyesters may also comprise monocarboxylic acids as synthesis components; these components are then located at the chain end, since only one esterification is possible. Mention may be made more particularly of 2-ethylhexanoic acid, isononanoic acid, isodecanoic acid, and other monocarboxylic acids prepared synthetically by the Koch or oxo process, pelargonic acid, distillation cuts of coconut fatty acids, palm kernel fatty acids and tallow, or else unsaturated fatty acids. The monocarboxylic acids are customarily used in conjunction with higher polyfunctional polyols. Mixtures may be used as well. One particular embodiment is the use of glycidyl esters of saturated monocarboxylic acids, in which case, as a result of the glycidyl ester group, further reactions and the attachment of further compounds are subsequently possible. Unsaturated polyester resins may also comprise hydroxycarboxylic acids and/or derivatives thereof, such as hydroxypivalic acid, dimethylolpropanoic acid, delta-valerolactone, epsilon-caprolactone, hydroxystearic acid.

The unsaturated polyesters preferably have an acid number of 0 to 40, preferably of 10 to 35 mg KOH/g; the number-average molecular weight is preferably 450 to 8000, more preferably 800 to 3000 g/mol. The equivalent mass, based on the molar fraction of the α-olefinic double bond, is preferably 170 to 1100, more preferably 200 to 800 g/mol; on the basis of the amount of α-olefinic double bonds, the equivalent mass gives the amount by weight of α-olefinically unsaturated polycarboxylic acids present in the polyester per mole of unsaturated polyesters.

The unsaturated polyesters can be prepared by customary processes described in the literature.

The composition which is liquid under standard conditions (20° C., 1 bar) necessarily comprises not only the unsaturated polyester resin but also compounds b) having vinyl ether groups (vinyl ethers for short).

The vinyl ethers are preferably vinyl ethers having one or two vinyl ether groups (monovinyl or divinyl ethers).

The molar weight of the vinyl ethers is preferably less than 500 g/mol.

With particular preference the vinyl ethers b) are divinyl ethers or mixtures of divinyl ethers and monovinyl ethers.

The vinyl ethers are more particularly aliphatic or cycloaliphatic compounds, which apart from the vinyl ether groups and optionally other ether groups contain no other functional groups.

The vinyl ethers (b) may be, for example, reaction products of different alkanols (monoalcohols and polyols) with acetylene. Contemplated more particularly as monovinyl ethers are ethyl vinyl ether, propyl vinyl ether, n-butyl vinyl ether, isobutyl vinyl ether, tert-butyl vinyl ether, 2-ethylhexyl vinyl ether, dodecyl vinyl ether, octadecyl vinyl ether, cyclohexyl vinyl ether, 4-hydroxybutyl vinyl ether, monovinyl ethers of dimethylolcyclohexane.

Examples of vinyl ethers of polyols, more particularly diols, include the following: butane-1,4-diol divinyl ether, ethylene glycol divinyl ether, diethylene glycol divinyl ether, triethylene glycol divinyl ether, neopentyl glycol divinyl ether, pentane-1,5-diol divinyl ether, hexane-1,6-diol divinyl ether, dimethylolcyclohexane divinyl ether.

The amount of the vinyl ethers in the liquid composition is preferably 1 to 100 parts by weight per 100 parts by weight of unsaturated polyester resin. The minimum amount of the vinyl ether is more preferably at least 5 parts by weight and very preferably at least 10 parts by weight per 100 parts by weight of polyester resin. Generally speaking, with particular preference, the amount of vinyl ether is not more than 50 parts by weight of vinyl ether per 100 parts by weight of polyester resin.

The composition which is liquid under standard conditions (20° C., 1 bar) may optionally comprise compounds c). Compounds c) are $\alpha$-olefinically unsaturated polycarboxylic acids, preferably dicarboxylic acids, or their monoesters or their diesters. The $\alpha$-olefinically unsaturated polycarboxylic acids are the same $\alpha$-olefinically unsaturated polycarboxylic acids which are used as a synthesis component for the unsaturated polyester resin (see above), or the corresponding monoesters or diesters of these unsaturated polycarboxylic acids.

Monoesters or diesters are preferably esters of the above-mentioned dicarboxylic acids, more particularly maleic acid, with aliphatic monoalcohols, more particularly C1 to C10 alkanols or cycloalkanols, such as methanol, ethanol, n-propanol, isopropanol, n-butanol, isobutanol, tert-butanol, pentanol, isoamyl alcohols, n-hexanol, 2-ethyl-hexanol, cyclohexanol, or else alkoxy-containing esters of correspondingly alkoxylated alcohols.

Preferred compounds c) are monoesters or diesters of $\alpha$-olefinically unsaturated dicarboxylic acids, more particularly of maleic acid. Especially preferred are the diesters.

The amount of constituents a), b), and c) in the liquid composition is selected such that the sum of the double bonds of the $\alpha$-olefinically unsaturated polycarboxylic acids from a) und optionally of the compounds c) to the double bonds of the vinyl ethers b) is in a molar ratio of 1.3:1 to 0.8:1, preferably in a molar ratio of 1.2:1 to 0.9:1, and more particularly in a molar ratio of 1.1:1 to 0.95:1. In one particularly preferred embodiment the amounts are equimolar.

Starting from the amount of the $\alpha$-olefinically unsaturated polycarboxylic acids in the polyester a) and from the amount of vinyl ether b) added, the amount of the compounds c) is then selected such that the above condition is met.

The liquid composition preferably comprises compounds c). The amount of the compound c) is then more particularly 1 to 20 parts by weight per 100 parts by weight of unsaturated polyester resin.

In addition to the compounds a), b), and c), the liquid composition may comprise further constituents.

Those contemplated include further film-forming constituents, which together with components a), b), and c) serve as binders and, after curing, form a coherent polymer film.

Film-forming constituents of this kind may be, in particular, further polymers, preferably radiation-curable polymers, as for example those with acrylic groups, or else other reactive diluents.

Examples of further reactive diluents include, for example, vinyl compounds such as N-vinylcaprolactam, N-vinylimidazole, N-vinylpyrrolidone, and divinylethyleneurea.

In one preferred embodiment at least 60% by weight, more particularly at least 80% by weight, very preferably at least 95% by weight, of all of the film-forming constituents of the composition are unsaturated polyester resins a), vinyl ethers b), and optionally compounds c).

Reactive diluents such as styrene or monomers which are liquid at room temperature and have one or more acrylic or methacrylic groups ((meth)acrylic monomers) are not needed in the liquid composition.

Preferably, therefore, the liquid composition contains less than 1% by weight of styrene, and more particularly it contains no styrene.

Preferably, therefore, the liquid composition contains less than 5% by weight, more particularly less than 2% by weight, of (meth)acrylic monomers; more preferably it contains no (meth)acrylic monomers.

Other constituents contemplated in the composition include, for example, photoinitiators, pigments, additives for improving the application characteristics, the film-forming, and the stability of films, including suitable UV-absorbers.

The composition may also comprise solvents, whether that be water or organic solvents. In the context of the present invention, however, such solvents are not necessarily required; the desired viscosities can be set without such solvents. The composition therefore preferably comprises less than 10% by weight, more particularly less than 5% by weight, and more preferably less than 3% by weight of water or organic solvents. In one particularly preferred embodiment the composition contains no water or organic solvents.

The composition is cured preferably by irradiation with high-energy light, more particularly UV light.

The composition therefore preferably comprises photoinitiators.

For crosslinking by UV light, in a preferred embodiment, a mixture of 0.5% to 5.0% (preferably 0.5% to 3.0%), based on the sum of the film-forming constituents, of free-radically acting UV initiators is used, optionally in combination with UV sensitizers and 0% to 2% of cationically acting UV initiators.

Free-radically acting UV initiators are, for example, benzophenone, which are often used in combination with tertiary amines as a UV sensitizer, e.g., N-methyl-diethanolamine, benzoin ethers, benzil, benzil ketals, hydroxyalkylphenones, $\alpha$-aminoalkylphenones, and mono- and bis-benzoylphosphine oxides.

Cationically acting UV initiators are, for example, aryldiazonium salts, diaryliodium salts, triarylsulfonium salts of tetrafluoroboric acid or of hexafluorophosphoric acid. Suitability for free-radically initiated crosslinking without UV light is possessed by the known peroxides as initiators in combination with redox systems such as metal salts and tertiary amines as accelerators for example methyl ethyl ketone peroxide and cobalt octoate, or benzoyl peroxide and dimethylbenzylamine.

The liquid composition is cured preferably by irradiation with high-energy light. For this purpose the composition is applied to the surfaces that are to be coated, after which curing of the coating takes place by irradiation with high-energy light, preferably UV light.

The liquid composition serves as coating material for a wide variety of surfaces and purposes. For example, surfaces of wood, paper, plastic or metal may be coated. The composition serves, for example, as a paint, whether it be a corrosion preventative, decorative paint, protective paint, pigmented paint or clearcoat paint, or as a printing ink.

The composition of the invention or the use of the invention meets the stated requirements for high reactivity in curing UV curing is inhibited hardly at all by atmospheric oxygen. High film thicknesses can be crosslinked flawlessly and homogeneously. The combinations of the film formers can also be used for UV coating materials with different pigmentation.

Thermal crosslinking using customary free-radical initiators and accelerators can also be carried out very effectively.

Generally, the compositions have a low viscosity and cure to give coatings having good performance properties, exemplified by good elasticity, good adhesion, and good solvent and chemical resistance. Physiologically objectionable constituents such as styrene can be dispensed with.

EXAMPLES

1. Preparation and Dissolution of an Unsaturated Polyester Resin

Weighed out into a laboratory reactor with regulable electrical resistance heating; product temperature control; inert gas inlet; close-clearance, steplessly regulable stirrer; packed column with overhead temperature measurement, ascending water separator, and reflux condenser, with the water separator full of azeotrope former (cyclohexane), were 223.3 g (2.94 mol) of propane-1,2-diol; 254.6 g (2.44 mol) of neopentyl glycol; 239.9 g (2.44 mol) of maleic anhydride; 362.2 g (2.44 mol) of phthalic anhydride, 0.05 g of hydroquinone as inhibitor, with 20 g of cyclohexane as azeotrope former. The mixture was heated to about 150° C. with introduction of nitrogen as inert gas. The temperature was then slowly raised to 180° C., causing azeotrope former and eliminated water to distill regularly. The reaction mixture was maintained at 180° C. until its acid number, determined by titrating a sample dissolved in a mixture of preneutralized ethanol and xylene (2:1) [DIN 53169], with 0.5 molar alcoholic potassium hydroxide solution against phenolphthalein had dropped below 35 mg KOH/g. The laboratory reactor was then switched to short-path operation (descending distillation bridge), and azeotrope former and residual water were removed by distillation. The product was then cooled. The polyester resin had an acid number of 25 mg KOH/g and a viscosity of 2.2 Pa·s, measured in a plate/cone viscosimeter at 150° C., and an equivalent mass of 442 g/mol.

Then, at a temperature of 90° C., 0.5 g of hydroquinone, dissolved in a small quantity of ethanol, was added and the melt of the unsaturated polyester resin was then dissolved in 330 g of butane-1,4-diol divinyl ether (equivalent mass 71 g/mol, molar weight 142 g/mol), the temperature being held below 60° C. during the dissolution. The solution is then cooled further. This results in a 75% strength solution of the unsaturated polyester in vinyl ether, having a viscosity of 39 Pa·s as measured in a plate/cone viscosimeter at 23° C., this solution being sufficiently storage-stable.

2. Preparation of a Coating Material for UV Crosslinking

Admixed to 200 g of the solution of the unsaturated polyester resin prepared according to example 1 (i.e., 0.34 equivalent) in butanediol divinyl ether (i.e., 0.70 equivalent) are 50 g of diethyl maleinate (i.e., 0.29 equivalent, based in each case on the fractions of unsaturated groups). The equivalent ratio of the sum of the maleic esters to the equivalents of the vinyl ether is 0.9/1.0. Then 5 g of a commercial free-radically acting UV initiator (Irgacure 500 from Ciba Spezialitätenchemie, a mixture of 50% 1-hdyroxy-cyclohexyl phenyl ketone and 50% benzophenone), and 0.12 g of a commercial cationically acting UV initiator (Irgacure 250 from Ciba Spezialitätenchemie, a 4-methylphenyl-4-(2-methylpropyl)phenyliodonium hexafluorophosphate) are added. The coating material has a viscosity of 0.51 Pa·s (plate/cone viscosimeter at 26.5° C.), with a polyester concentration of 60% by weight.

3. Comparative Example

Dissolving the unsaturated polyester resin described in example 1 in a reactive diluent customary for UV coating materials—here, tripropylene glycol diacrylate was used—results, for a 70% strength solution, in a viscosity of 26 Pa·s and, for a 60% strength solution, in a viscosity of 7 Pa·s (plate/cone viscosimeter); in other words, far higher viscosities.

4. Application

The coating material described in example 2 was applied using a bar coater to glass plates in a wet film thickness of 100 μm, and then cured in a laboratory unit for UV curing, Aktiprint Mini, with a mercury lamp and with a power of 80 W/cm and a rate of advance of 2 m/min, in 5 and 10 passes. The coating was fully cured and had good performance properties.

The invention claimed is:

1. A method of coating a surface, the method comprising contacting a surface with a composition which is liquid under standard conditions (20° C., 1 bar), wherein the composition comprises
   a) an unsaturated polyester resin comprising, in reacted form, an α-olefinically unsaturated polycarboxylic acid, a polyol, and optionally a further compound,
   b) a vinyl ether compound, and
   c) an α-olefinically unsaturated polycarboxylic acid monoester or diester of a C1 to C10 alkanol or cycloalkanol,
   where a molar ratio of (i) to (ii) is in a range of 1.3:1 to 0.8:1, wherein (i) is a sum of double bonds of the α-olefinically unsaturated polycarboxylic acid of a) and the α-olefinically unsaturated polycarboxylic acid monoester or diester of c), and wherein (ii) is a sum of double bonds of the vinyl ether compound b).

2. The method of claim 1, wherein the composition comprises less than 1% by weight of styrene, based on a weight of the composition.

3. The method of claim 1, wherein the composition comprises less than 5% by weight of a (meth)acrylic monomer, based on a weight of the composition.

4. The method of claim 1, wherein the unsaturated polyester resin further comprises, in reacted form, at least one acid selected from the group consisting of a saturated polycarboxylic acid, and a monocarboxylic acid, and wherein the unsaturated polyester resin has an acid number of 0 to 45 mg KOH/g.

5. The method of claim 1, wherein the unsaturated polyester resin has a number-average molar weight Mn of 450 to 8000 g/mol.

6. The method of claim 1, wherein the unsaturated polyester resin comprises, in reacted form, maleic acid and c) is at least one selected from the group consisting of maleic monoester and maleic diester.

7. The method of claim 1, wherein the vinyl ether compound comprises a monovinyl or divinyl ether having a molar weight of less than 500 g/mol.

8. The method of claim 1, wherein the vinyl ether compound comprises a divinyl ether.

9. The method of claim 1, wherein the vinyl ether compound is aliphatic or cycloaliphatic and which apart from a vinyl ether group and optionally other ether groups contains no other functional groups.

10. The method of claim 1, wherein an amount of the vinyl ether compound is 1 to 100 parts by weight per 100 parts by weight of the unsaturated polyester resin.

11. The method of claim 1, wherein an amount of c) is 1 to 20 parts by weight per 100 parts by weight of the unsaturated polyester resin.

12. The method of claim 1, wherein at least 80% by weight of all film-forming constituents of the composition are a), b), and c).

13. The method of claim 1, wherein the composition comprises a photoinitiator.

14. The method of claim 1, wherein the composition comprises less than 5% by weight of water or an organic solvent, based on a weight of the composition.

15. The method of claim 1, further comprising, subsequent to the contacting, curing the composition by irradiation with light capable of said curing.

16. A coated article obtained by the method of claim 15.

17. The method of claim 1, wherein the unsaturated polyester resin has an acid number of 0 to 45 mg KOH/g.

18. The method of claim 1, wherein the unsaturated polyester resin comprises, in reacted form, maleic acid.

19. The method of claim 1, wherein the vinyl ether compound comprises a monovinyl ether.

20. A coating material comprising
 a) an unsaturated polyester resin comprising, in reacted form, an α-olefinically unsaturated polycarboxylic acid, a polyol, and optionally a further compound,
 b) a vinyl ether compound, and
 c) an α-olefinically unsaturated polycarboxylic acid monoester or diester of a C1 to C10 alkanol or cycloalkanol,
 where a molar ratio of (i) to (ii) is in a range of 1.3:1 to 0.8:1, wherein (i) is a sum of double bonds of the α-olefinically unsaturated polycarboxylic acid of a) and the α-olefinically unsaturated polycarboxylic acid monoester or diester of c), and wherein (ii) is a sum of double bonds of the vinyl ether compound b).

* * * * *